US008457698B2

(12) United States Patent
Samardzija et al.

(10) Patent No.: US 8,457,698 B2
(45) Date of Patent: Jun. 4, 2013

(54) ANTENNA ARRAY FOR SUPPORTING MULTIPLE BEAM ARCHITECTURES

(75) Inventors: Dragan M. Samardzija, Highlands, NJ (US); Cuong Tran, Howell, NJ (US); Howard C. Huang, New York, NY (US); Susan J. Walker, Freehold, NJ (US); Reinaldo A. Valenzuela, Holmdel, NJ (US)

(73) Assignee: Alcatel Lucent, Paris (FR)

( * ) Notice: Subject to any disclaimer, the term of this patent is extended or adjusted under 35 U.S.C. 154(b) by 143 days.

(21) Appl. No.: 12/984,932

(22) Filed: Jan. 5, 2011

(65) Prior Publication Data

US 2012/0172096 A1 Jul. 5, 2012

(51) Int. Cl.
*H04M 1/00* (2006.01)

(52) U.S. Cl.
USPC ...... 455/575.7; 455/63.1; 455/69; 455/552.1; 455/561; 455/562.1

(58) Field of Classification Search
USPC .................... 455/63.4, 69, 552.1, 553.1, 561, 455/562.1, 575.7; 375/260, 267
See application file for complete search history.

(56) References Cited

U.S. PATENT DOCUMENTS 5,771,017 A * 6/1998 Dean et al. .................... 342/374
5,838,282 A * 11/1998 Lalezari et al. ............... 343/727
5,889,494 A * 3/1999 Reudink et al. ............... 342/373
6,246,674 B1 * 6/2001 Feuerstein et al. ............ 370/334
6,370,182 B2 * 4/2002 Bierly et al. .................. 375/140
7,415,296 B2 * 8/2008 Kenoun et al. ............. 455/575.7
8,063,822 B2 * 11/2011 Adams et al. ................. 342/373
8,195,240 B2 * 6/2012 Jin et al. ..................... 455/562.1
8,224,387 B2 * 7/2012 Bishop ....................... 455/562.1
2002/0068613 A1 * 6/2002 Miyano et al. ................ 455/562
2003/0032424 A1 2/2003 Judd et al.
2011/0309980 A1 * 12/2011 Ali et al. ....................... 342/368

FOREIGN PATENT DOCUMENTS

EP 1 320 146 6/2003
WO WO 97/44914 11/1997

OTHER PUBLICATIONS

S. Breyer et al., "UMTS Node B Architecture in a Multi-Standard Environment," Electrical Communication, Alcatel, Brussels, BE, Jan. 1, 2001, pp. 50-54, XP001048842.
International Search Report and Written Opinion dated Jun. 4, 2012.

* cited by examiner

*Primary Examiner* — Olumide T Ajibade Akonai
(74) *Attorney, Agent, or Firm* — Harness, Dickey & Pierce, P.L.C.

(57) ABSTRACT

The present invention relates to an antenna array for supporting multiple beam architectures. For example, a transceiver may include an antenna array. The antenna array includes a plurality of antenna elements, where the plurality of antenna elements is configured to support at least two beam architectures in a cell site. Each beam architecture is associated with a different configuration of sectors and beamforming signals. According to one embodiment, each beam architecture is associated with a different wireless standard. According to another embodiment, each beam architecture is associated with a different carrier within one wireless standard. The antenna elements may be arranged as a circular array.

18 Claims, 5 Drawing Sheets

FIG. 4

| | | | | | | | | | | | | | | | | | |
|---|---|---|---|---|---|---|---|---|---|---|---|---|---|---|---|---|---|
| B1 | | 22 23 24 1 2 | 3 | 4 | | | | | | | | | | | | | |
| B2 | | 24 1 2 | 3 | 4 | 5 | 6 | | | | | | | | | | | |
| B3 | | 2 | 3 | 4 | 5 | 6 7 | 8 | | | | | | | | | | |
| B4 | | | | 4 | 5 | 6 7 | 8 | 9 10 | | | | | | | | | |
| B5 | | | | | | 6 7 | 8 | 9 10 | 11 | 12 | | | | | | | |
| B6 | | | | | | | 8 | 9 10 | 11 | 12 13 | 14 | | | | | | |
| B7 | | | | | | | | 10 | 11 | 12 13 | 14 15 16 | | | | | | |
| B8 | | | | | | | | | | 12 13 | 14 15 16 | 17 | 18 | | | | |
| B9 | | | | | | | | | | | 14 15 16 | 17 | 18 19 | 20 | | | |
| B10 | | | | | | | | | | | 16 | 17 | 18 19 | 20 21 22 | | | |
| B11 | | | | | | | | | | | | | 18 19 | 20 21 22 | 23 | 24 | |
| B12 | | | | | | | | | | | | | | 20 21 22 | 23 | 24 | 1 2 |

ANTENNA ARRAY FOR SUPPORTING MULTIPLE BEAM ARCHITECTURES

BACKGROUND

A number of wireless technologies are expected to be implemented on a same cell site. For example, second generation (2G), third generation (3G), and fourth generation (4G) wireless technologies are to be simultaneously operational, with future incremental migration from 2G to 3G and then 4G. Those aspects are particularly important as a part of converged radio access networks. Re-use of the same cell towers, radio-frequency cabling, and antenna arrays is highly desirable providing cost-effective multi-technology solutions.

One of the key issues is that different technologies require different beam architectures. For example, for each cell (i.e., sector) in the downlink, Global System for Mobile Communications (GSM) supports single-antenna transmission, High Speed Packet Access (HSPA) supports two-antenna transmission, and Long Term Evolution (LTE) supports up to four-antenna transmission. If a service provider decides to deploy LTE with 3 cells per site, and 4 antennas per cell, the service provider may have to manually implement additional antenna elements on the existing antenna configuration.

SUMMARY

The present invention relates to an antenna array for supporting multiple beam architectures.

For example, a transceiver may include an antenna array. The antenna array includes a plurality of antenna elements, where the plurality of antenna elements is configured to support at least two beam architectures in a cell site. Each beam architecture is associated with a different configuration of sectors and beamforming signals. According to one embodiment, each beam architecture is associated with a different wireless standard. According to another embodiment, each beam architecture is associated with a different carrier within one wireless standard. The antenna elements may be arranged as a circular array.

The transceiver may further include a plurality of beamformer units, where each beamformer unit is associated with a different beam architecture and each beamformer unit is configured to generate a number of beamforming signals. Each beamforming signal may include a plurality of radio-frequency (RF) signals corresponding to a sub-set of antenna elements of the plurality of antenna elements. Each beamforming signal from each beamformer unit may be associated with a different sector in the cell site, and a number of beamforming signals may correspond to a number of sectors for a respective beam architecture. At least two beamforming signals generated from one beamformer unit may use at least two of the same antenna elements in the sub-set.

Also, the transceiver may further include a plurality of baseband units, where each baseband unit is associated with a different beam architecture and configured to generate baseband signals. Each baseband signal may correspond to a different sector. Each beamformer unit may be configured to generate a beamforming signal for a particular sector based on beamforming coefficients and a baseband signal received from a respective baseband unit, and each beamforming coefficient may correspond to a different antenna element in the sub-set. Each beamformer unit may multiply the baseband signal with each beamforming coefficient to generate the RF signals included in one beamforming signal.

The transceiver may further include a plurality of RF modulation units, where each RF modulation unit is configured to modulate the RF signals from a respective beamformer unit to a different frequency band. The transceiver may further include a summation unit that is configured to sum the modulation RF signals from each RF modulation unit, where the summed modulated RF signals are transmitted over the antenna elements to produce the beamforming signals for each of the at least two beam architectures.

According to another embodiment, the transceiver may include an antenna array that includes a plurality of antenna elements. The plurality of antenna elements is configured to support a first beam architecture and a second beam architecture using same antenna elements, where the first beam architecture is associated with a configuration of sectors and beamforming signals that is different than the second beam architecture. The transceiver further includes a first beamformer unit associated with the first beam architecture, and configured to generate a plurality of first beamforming signals over the antenna elements, where each first beamforming signal includes a plurality of first radio-frequency (RF) signals corresponding to a first sub-set of antenna elements of the antenna elements. The transceiver further includes a second beamformer unit associated with the second beam architecture, and configured to generate a plurality of second beamforming signals over the antenna elements, where each second beamforming signal includes a plurality of second RF signals corresponding to a second sub-set of antenna elements of the antenna elements.

In one embodiment, the first beam architecture is associated with a first wireless standard and the second beam architecture is associated with a second wireless standard, where the first wireless standard is different than the second wireless standard. In other embodiment, the first and second beam architectures are associated with a same wireless standard, and the first beam architecture is associated with a carrier different than the second beam architecture.

In one embodiment, a number of first beamforming signals corresponds to a number of sectors in the first beam architecture, and a number of second beamforming signals corresponds to a number of sectors in the second beam architecture. Also, at least two first beamforming signals use at least two of the same antenna elements in the first sub-set, and at least two second beamforming signals use at least two of the same antenna elements in the second sub-set.

The transceiver may further include a first baseband unit associated with the first beam architecture and configured to generate first baseband signals, where each first baseband signal is associated with a different sector in the first beam architecture, and a second baseband unit associated with the second beam architecture and configured to generate second baseband signals, where each second baseband signal is associated with a different sector in the second beam architecture. The first beamformer unit may be configured to generate a first beamforming signal based on first beamforming coefficients and a first baseband signal, and each first beamforming coefficient may correspond to a different antenna element in the first sub-set. Also, the second beamformer unit may be configured to generate a second beamforming signal based on second beamforming coefficients and a second baseband signal, and each second beamforming coefficient may correspond to a different antenna element in the second sub-set. In one embodiment, a number of antenna elements in the second sub-set is greater than a number of antenna elements in the first sub-set.

The transceiver may further include a first RF modulation unit associated with the first beam architecture, and configured to modulate the first RF signals to a first frequency band, and a second RF modulation unit associated with the second beam architecture, and configured to modulate the second RF signals to a second frequency band. The first frequency band may be different than the second frequency band.

The transceiver may further include a summation unit configured to sum the first modulated RF signals with the second modulated RF signals, where the summed modulated RF, signals are transmitted over the same antenna elements to produce the first and second beamforming signals for each of the first and second beam architectures.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein:

FIG. 4 illustrates an antenna element mapping chart according to an embodiment of the present invention.

DETAILED DESCRIPTION OF EXAMPLE EMBODIMENTS

Figure 1:
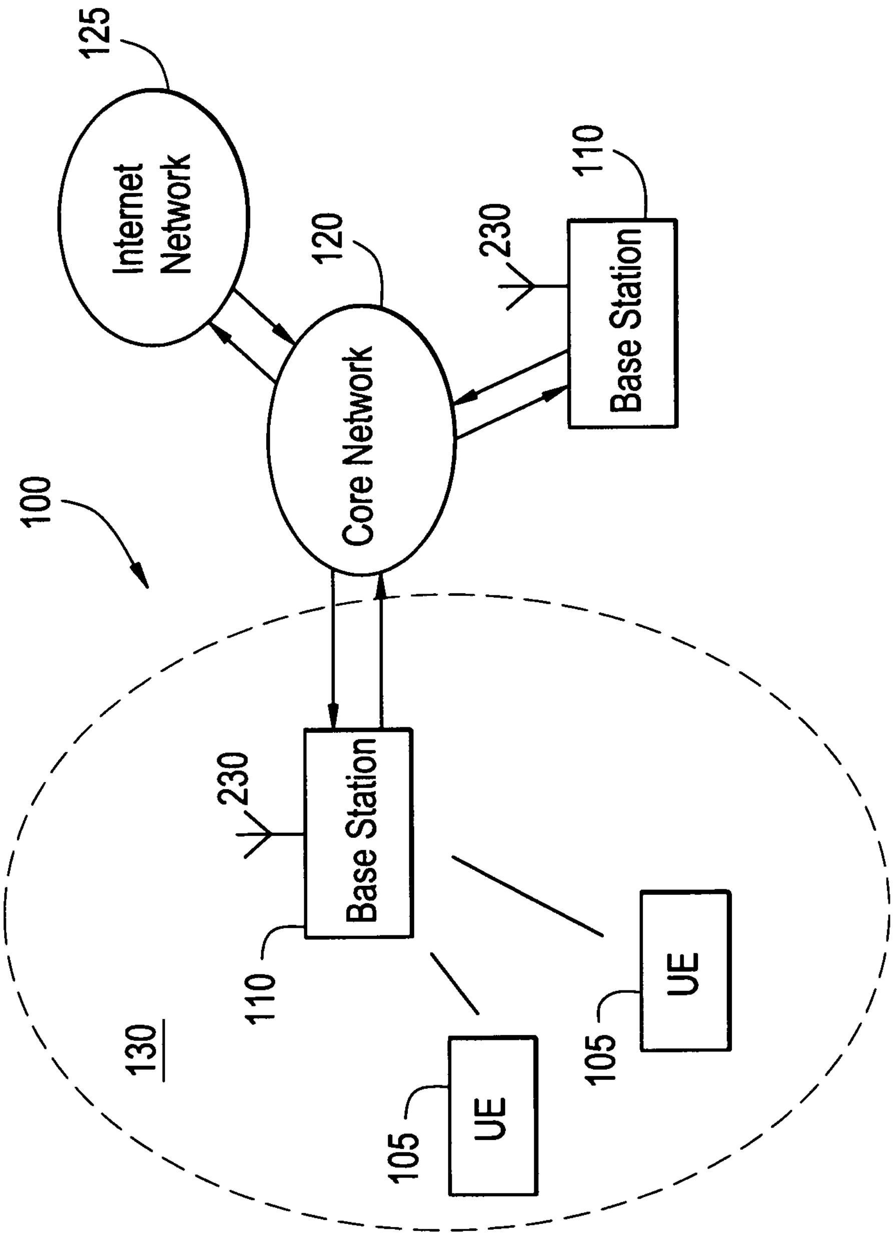
FIG. 1 illustrates a system for implementing an antenna array for supporting multiple beam architectures according to an embodiment of the present invention.

Various example embodiments of the present invention will now be described more fully with reference to the accompanying drawings in which some example embodiments of the invention are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "generating" or "summing" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more user equipments. The term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network.

Embodiments of the present invention provide an antenna array that supports multiple beam architectures. A beam architecture relates to a number of sectors in a cell site and a number of beamforming signals per sector. Different beam architectures have a different configuration of sectors and beamforming signals. For example, one type of beam architecture may have 12 sectors per cell site and one beamforming signal per sector, and another type of beam architecture may have one sector per cell site and multiple beamforming signals in the sector. As a result, the antenna array of the present invention may support multiple wireless technologies (e.g., standards) such as Global System for Mobile Communications (GSM), Code Division Multiple Access (CDMA)/High Speed Packet Access (HSPA), Long Term Evolution (LTE), and/or CDMA/LTE, among others, for example. In addition, the antenna array may support multiple carriers in one type of wireless standard, where each carrier implements a different beam architecture. In other words, the same antenna array (e.g., the same antenna hardware) is used with different beam architectures, where each beam architecture may be associated with a different wireless standard or carrier.

FIG. 1 illustrates a system for implementing an antenna array for supporting multiple beam architectures in a wireless communication system according to an embodiment of the present invention.

The wireless communication system 100 illustrated in FIG. 1 may support a plurality of technologies such as GSM, HSPA, LTE and/or multiple carriers, for example. As shown in FIG. 1, the wireless communication system 100 includes user equipments (UEs) 105, base stations 110, a core network 120, and an internet network 125. In addition, the wireless communication system 100 may include other networking elements used for the transmission of data over the wireless communication system 100 that are well known in the art. The base station 110 may be a multi-standard base station (MBS), which includes modules that support each of the above wireless technologies.

Each UE 105 communicates with the base station 110 (and vice versa) over an air interface. Techniques for establishing, maintaining, and operating the air interfaces between the UEs 105 and the base station 110 to provide uplink and/or downlink wireless communication channels between the base station 110 and the UEs 105 are known in the art and in the interest of clarity only those aspects of establishing, maintaining, and operating the air interfaces that are relevant to the present disclosure will be discussed herein.

A cell site 130 may serve a coverage area of the base station 110 called a cell, and the cell may be divided into a number of sectors. For ease of explanation, the terminology cell may refer to either the entire coverage area served by the cell site 130 or a single sector of the cell site 130. Communication from the cell site 130 of the base station 110 to the UE 105 is referred to as the forward link or downlink. Communication from the UE 105 to the cell site 130 of the base station 110 is referred to as the reverse link or uplink.

The base station 110 includes a transceiver for transmitting and/or receiving information over the air interfaces. The transceiver includes an antenna array 230. The antenna array 230 may include multiple antennas or antenna elements. The base station 110 may employ multiple-input-multiple-output (MIMO) techniques so that the multiple antenna elements in the antenna array 230 can transmit multiple independent and distinct signals to the UEs 105 on the same frequency band using spatially multiplexed channels of the air interfaces and/or different frequency bands using an RF modulation scheme in order to support multiple carriers or standards.

According to embodiments of the present invention, the antenna array 230 is configured to support multiple beam architectures, where each beam architecture may relate to a different wireless standard or carrier. The antenna array 230 uses the same antenna hardware, which is reused by the multiple beam architectures employed by the wireless communication system 100.

A beam architecture relates to a number of sectors in the cell site 130 and a number of beamforming signals per sector. For example, S may be the number of sectors per cell site 130, and b(s) may be the number of beamforming signals for each sector s, where s=1, . . . , S. Therefore, one beam architecture may include any number of sectors per cell site 130 and any number of beamforming signals per sector. The beamforming signals may be adaptive signals that may vary in direction and beamwidth, or may be fixed beams.

In GSM, the wireless communication system 100 may have a beam architecture that supports 12 sectors per cite site 130, and one beamforming signal per sector. In HSPA, the wireless communication system 100 may have a beam architecture that supports 6 sectors per cite site 130 and two beamforming signals per sector. In LTE, the wireless communication system 100 may have a beam architecture that supports 3 sectors per cite site 130, and four beamforming signals per sector. As such, each of the above wireless standards supports a different beam architecture. However, embodiments of the present invention encompass any type beam architecture.

The base station 110 is configured to perform beamforming over a certain number of antenna elements of the antenna array 230 based on information received from the UE 105 being served by the base station 110. Beamforming is a signal processing technique used to control the directionality of the reception or transmission of a signal on the antenna array 230. The information received from the UE 105 may be used by a beamformer unit of the base station 110 to control the characteristics of a signal best used for communicating with the UE 105. Embodiments of the present invention encompass any type of beamforming technique that is well known in the art. However, according to embodiments of the present invention, the antenna elements are reused when transmitting beamforming signals over the antenna array 230 in order to support the multiple beam architectures. The details of the antenna array 230 is further explained with reference to FIGS. 2-5.

The base station 110 may transmit and receive information from a core network 120, which is the central part of the wireless communication network 100. For example, in UMTS, the core network 120 may include a mobile switching center (MSC), radio network controller (RNC), which may access the internet network 125 through a gateway support node (GSN) and/or access a public switched telephone network (PSTN) through a mobile switching center (MSC) to provide connectivity to the other base station 110. The RNC in UMTS networks provides functions equivalent to the Base Station Controller (BSC) functions in GSM networks.

Figure 2:
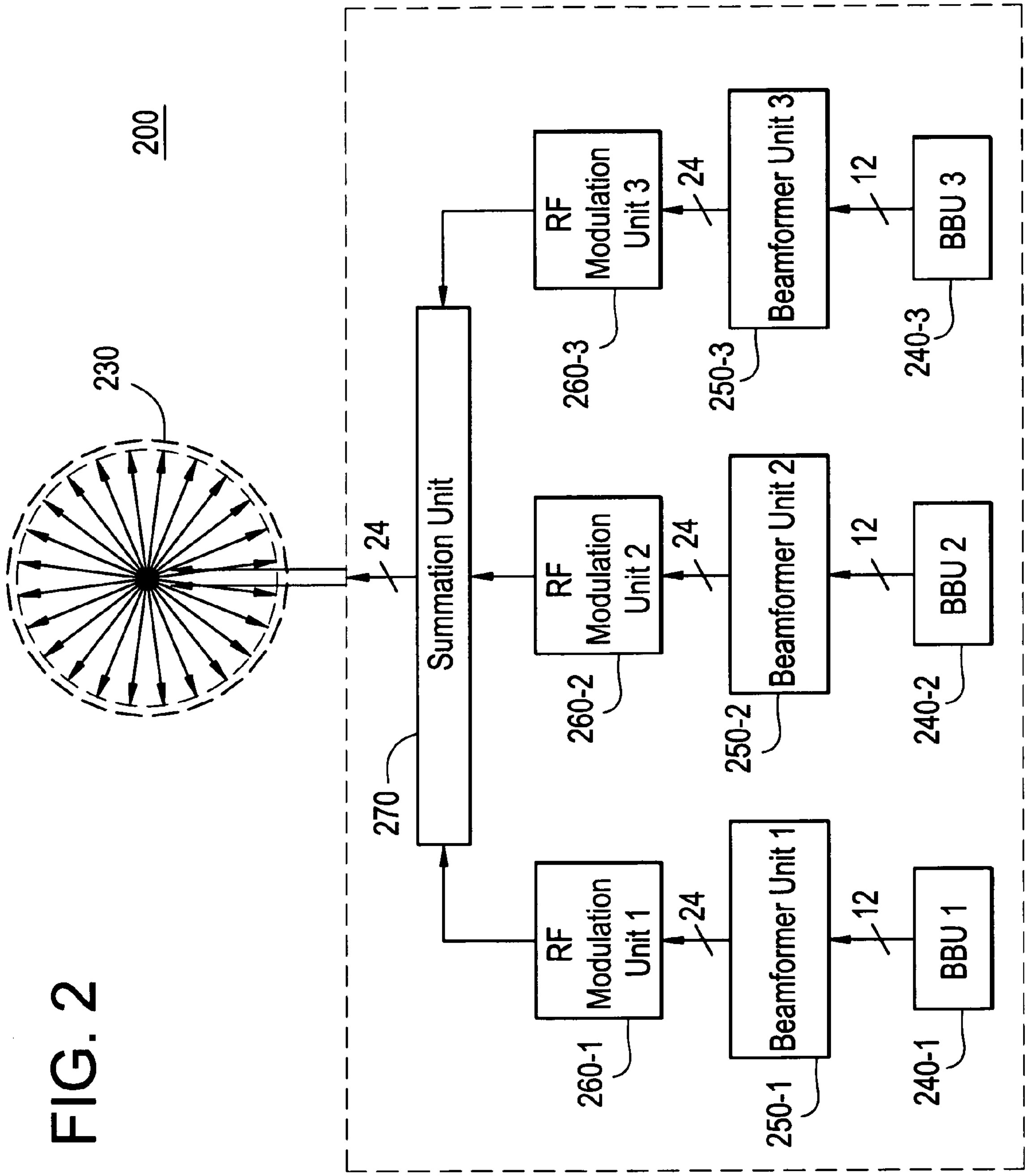
FIG. 2 illustrates a transceiver having an antenna array for transmitting data on a downlink communication channel according to an embodiment of the present invention.

FIG. 2 illustrates a transceiver 200 having an antenna array 230 for transmitting data on a downlink communication channel according to an embodiment of the present invention.

The transceiver 200 is configured to support multiple beam architectures, where each beam architecture is associated with a different configuration of sectors and beamforming signals. The transceiver 200 includes an antenna array 230 having a plurality of antenna elements. As shown in FIG. 2, the plurality of antenna elements may be arranged as a circular array. Also, the plurality of antenna elements may be placed on a hemisphere to form multiple beamforming signals. Furthermore, embodiments of the present invention encompass a conformal antenna array with closely-spaced antenna elements which are arranged in an arbitrary configuration to conform to given physical constraints of the deployment environment. In other words, the conformal antenna array may be specifically adapted to a particular environment such as a building. In the case of a building, the conformal antenna array may include two panels having antenna elements, where each panel is located on adjoining sides of the building. However, embodiments of the present invention encompass any other type of arrangement for the antenna elements such as a triangular structure, for example.

The antenna array 230 may be dimensioned such that the separation between adjacent antenna elements does not exceed half of the carrier wavelength. However, spacing between antenna element may encompass any value. The plurality of antenna elements are configured to support at least two different beam architectures using the same antenna elements. However, embodiments of the present invention encompass any number of beam architectures.

The transceiver 200 may include a plurality of baseband units (BBU) 240, a plurality of beamformer units 250, a plurality of RF modulation units 260, and a summation unit 270. The transceiver 200 also may include other components that are well known in the art such as a calibration unit, for example. A separate beamformer unit 250, BBU 240, and RF modulation unit 260 are provided for each beam architecture. For example, if the transceiver 200 supports two beam architectures, only two BBUs 240, two beamformer units 250, and two RF modulation units 260 are required.

However, in the particular embodiment shown in FIG. 2, the transceiver 200 supports three different beam architectures. For example, the first RF modulation unit 260-1, the first beamformer unit 250-1, and the first BBU 240-1 ("first branch") may be associated with the GSM standard, which implements 12 sectors per cite site 130, and one beamforming signal per sector. The second RF modulation unit 260-2, the second beamformer unit 250-2, and the second BBU 240-2 ("second branch") may be associated with the HSPA standard, which implements 6 sectors per cite site 130 and two beamforming signals per sector. The third RF modulation unit 260-3, the third beamformer unit 250-3, and the third BBU 240-3 ("third branch") may be associated with the LTE standard, which implements 3 sectors per cite site 130, and four beamforming signals per sector. Therefore, each of the three branches that are connected to the summation unit 130 relate to three different beam architectures. Also, each of the three branches operate according to a different frequency band. The data streams, which originate from a respective BBU 240, may be simultaneously transmitted over the plurality of antenna elements using beamforming, as further described below.

Referring to the GSM branch (first branch), the first BBU 240 generates baseband signals (e.g., 12 baseband signals) that include data streams to be transmitted to the UEs 105 in each of the 12 sectors of the cell site 130 on the downlink communication channel. The first beamformer unit 250-1 receives the baseband signals from the first BBU 240, and generates a number of beamforming signals, where each beamforming signal is associated with a different sector in the cell site 130. In the first branch, the number of beamforming signals corresponds to the number of sectors in the beam architecture. In the case of GSM, the number of sectors is 12. This feature is further explained with reference to FIGS. 3A and 3B.

Figure 3A:
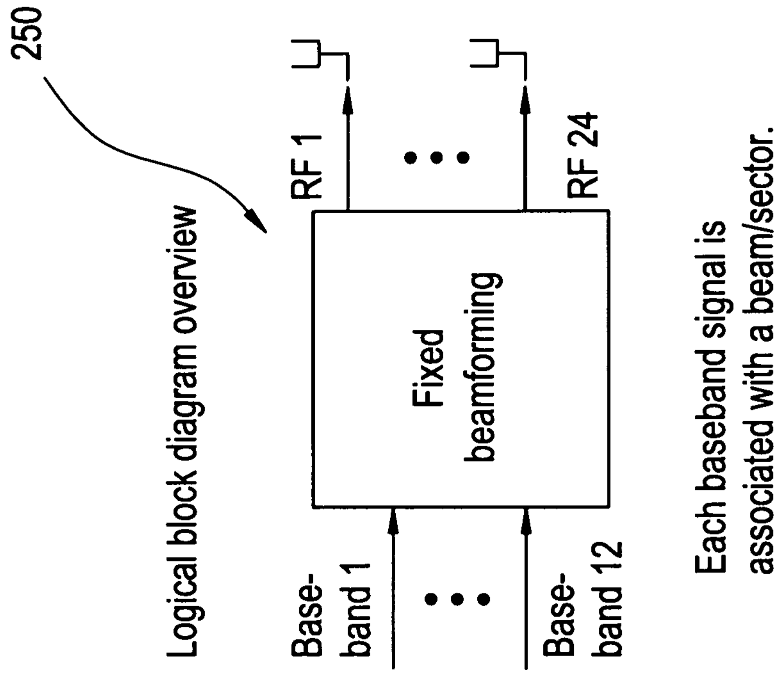
FIG. 3A illustrates a logical block of a beamformer unit according to an embodiment of the present invention.
Figure 3B:
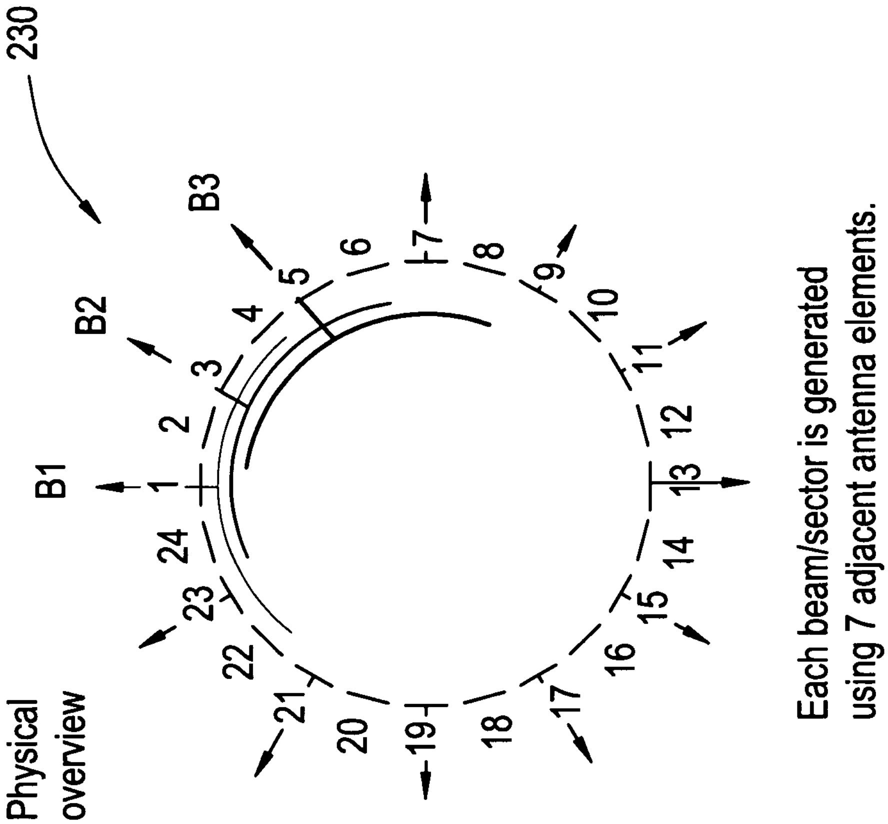
FIG. 3B illustrates a physical overview of the antenna elements showing beamforming signals according to an embodiment of the present invention.

FIG. 3A illustrates a logical block of a beamformer unit 250 according to an embodiment of the present invention and FIG. 3B illustrates a physical overview of the antenna elements showing the beamforming signals according to an embodiment of the present invention.

Referring to FIGS. 3A and 3B, the beamformer unit 250 receives a baseband signal for each of the sectors, and generates a plurality of beamforming signals over the plurality of antenna elements. Each baseband signal is associated with a beamforming signal (and sector).

However, each beamforming signal is generated using a sub-set of antenna elements. In this case, each beamforming signal is generated using 7 adjacent antenna elements, as shown in FIG. 3B. For example, beamforming signal 1 (B1) is generated using antenna elements 22, 23, 24, 1, 2, 3 and 4, beamforming signal 2 (B2) is generated using antenna elements 24, 1, 2, 3, 4, 5 and 6, and beamforming signal 3 (B3) is generated using antenna elements 2-8. The same is repeated for each of the remaining beamforming signals. Described another way, each beamforming signal includes a plurality of radio-frequency (RF) signals that are generated across the sub-set of antenna elements. In the example in FIG. 3A, the beamformer unit 250 generates 24 RF signals based on the 12 baseband signals. The 24 RF signals are used to form each of the 12 beamforming signals. For example, B1 includes the RF signals across antenna elements 22, 23, 24, 1, 2, 3 and 4, B2 includes the RF signals across antenna elements 24 and 1-6, and B3 includes the RF signals across antenna elements 2-8.

As shown in FIG. 3B, the same antenna elements are reused for generating the beamforming signals. For example, at least two beamforming signals from the beamformer unit 250 use at least two (or more) of the same antenna elements in the subset. Stated another way, the antenna elements in an adjacent beamforming signal are shifted from the previous beamforming signal. Therefore, the RF signals over each antenna element are usually a summation of the RF signal for one particular beamforming signal and the RF signal for another particular beamforming signal (or more). For example, in FIG. 3B, the RF signal of B1 over antenna element 24 and the RF signal of B1 over antenna element 24 are added.

FIG. 4 illustrates an antenna element mapping chart according to an embodiment of the present invention. The chart shows which antenna elements correspond to each beamforming signal for the first beamformer unit 250-1, which is a continuation of the above discussion. However, embodiments of the present invention encompass any type of antenna mapping. For example, if a different antenna structure such as an triangular antenna structure is used, the mapping between the antenna elements and the beamforming signals will change. In addition, if the number of antenna elements is different than 24, the mapping between the antenna element and the beamforming signal will change. Furthermore, the mapping is dependent upon the number of sectors in the cell site 130 and the number of beamforming signals per sector.

The first beamformer unit 250-1 generates each of the beamforming signals based on respective beamforming coefficients and a respective baseband signal. For example, the beamforming coefficients of B1 may be $A_{22}$, $A_{23}$, $A_{24}$, $A_1$, $A_2$, $A_3$ and $A_4$. These beamforming coefficients correspond to antenna elements 22, 23, 24, 1, 2, 3, and 4. The first beamformer unit 250-1 multiples baseband signal $X_1$ by each of the beamforming coefficients $A_{22}$, $A_{23}$, $A_{24}$, $A_1$, $A_2$, $A_3$ and $A_4$ to produce the RF signals for antenna elements 22, 23, 24, 1, 2, 3, 4 for the beamforming signal B2. Similarly, the beamforming coefficients of B2 may be $B_{24}$, $B_1$, $B_2$, $B_3$, $B_4$, $B_5$, $B_6$. The first beamformer unit 250-1 multiples baseband signal $X_2$ by each of the beamforming coefficients $B_{24}$, $B_1$, $B_2$, $B_3$, $B_4$, $B_5$, $B_6$ to produce the RF signals for antenna elements 24 and 1-6 for the beamforming signal B1. The beamforming coefficients may be fixed or determined adaptively.

Referring back to FIG. 2, the first RF modulation unit 260-1 modulates the RF signals from the first beamformer unit 250-1 to a particular frequency band, which is different from the frequency band of the second branch and the third branch. In other words, each branch operates according to a different frequency band.

In the second branch (e.g., the HSPA standard), the second BBU 240-2, the second beamformer unit 250-2 and the second RF modulation unit 260-2 operate in a similar manner. However, as indicated above, the beam architecture of the HSPA standard implements 6 sectors per cite site 130 and two beamforming signals per sector. Therefore, the second baseband unit 240-2 generates 12 baseband signals, where 2 baseband signals are included in each of the 6 sectors. The second beamformer unit 250-2 generates 6 beamforming signals, where each beamforming signal is generated over a subset of antenna elements. However, in this implementation, the subset of antenna elements in the second beam architecture (e.g., HSPA) is greater than the subset of antenna elements in the first beam architecture (e.g., GSM). For example, instead of generating a beamforming signal over 7 antenna elements, the beamforming signal is generated over 9 antenna elements, for example. None-the-less, the operation of generating the beamforming signals/RF signals are the same as previously described.

In the third branch (e.g., the LTE standard), the third BBU 240-3, the third beamformer unit 250-3 and the third RF modulation unit 260-3 operate in a similar manner. However, as indicated above, the beam architecture of the LTE standard implements 3 sectors per cite site 130, and four beamforming signals per sector. Therefore, the third baseband unit 240-3 generates 4 baseband signals for each sector. The third beamformer unit 250-3 generates 3 beamforming signals, where each beamforming signal is generated over a subset of antenna elements. However, in this implementation, the subset of antenna elements in the third beam architecture (e.g., LTE) is greater than the subset of antenna elements in the first beam architecture (e.g., GSM) and the second beam architecture (e.g., HSPA). None-the-less, the operation of generating the beamforming signals/RF signals are the same as previously described.

The summation unit 270 is configured to sum the modulation RF signals from each of the RF modulation units 260 across the standards, for example. As a result, the summed modulated RF signals are transmitted over the antenna elements to produce the beamforming signals for each of the multiple beam architectures.

Figure 5:
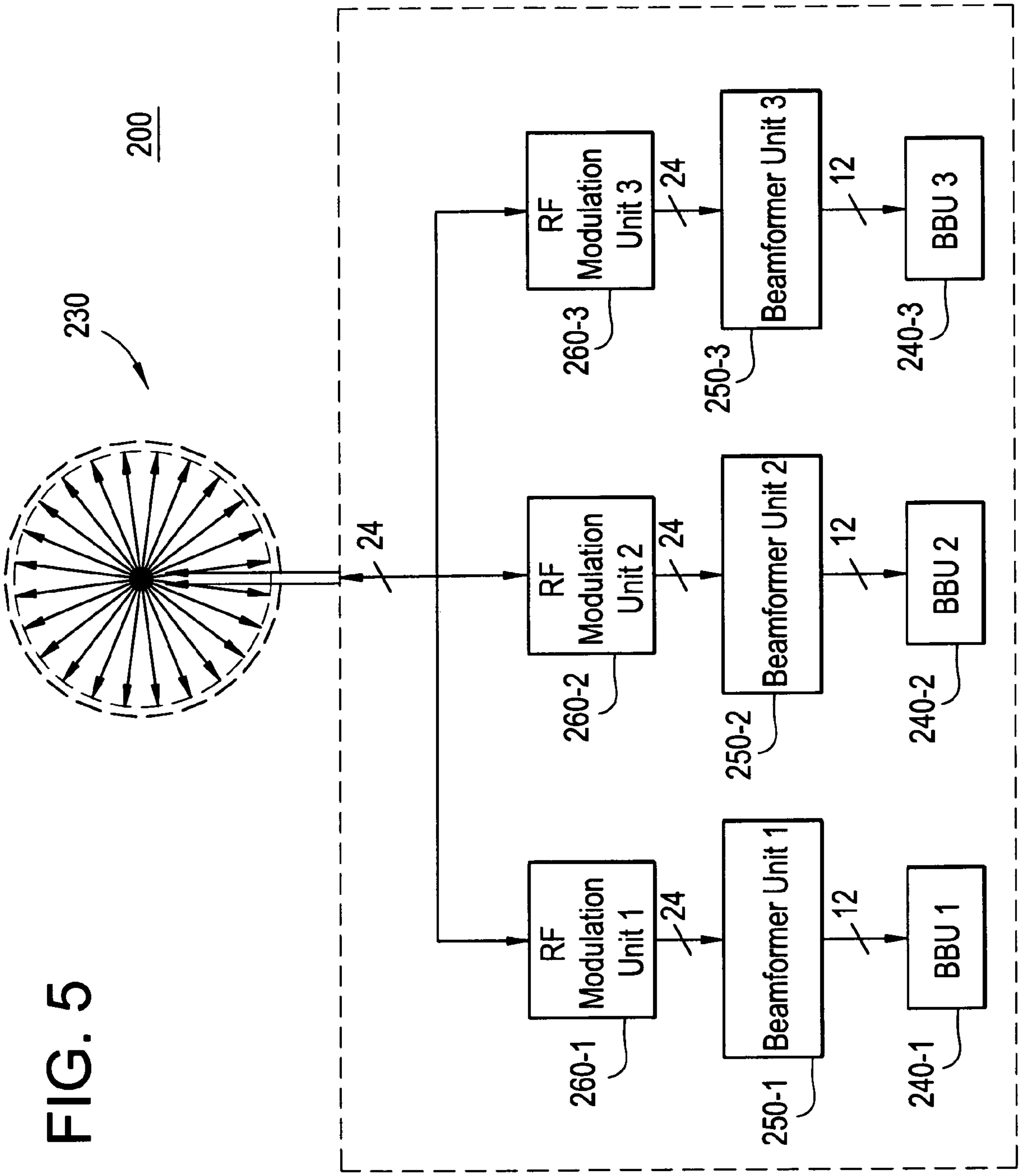
FIG. 5 illustrates a transceiver having an antenna array for receiving data on an uplink communication channel according to an embodiment of the present invention.

FIG. 5 illustrates a transceiver 200 having an antenna array 230 for receiving data on an uplink communication channel according to an embodiment of the present invention.

The transceiver 200 in FIG. 5 operates in a similar manner as previously described with reference to FIGS. 2-5. However, each of the RF modulation units 260 receives the RF signals from the antenna elements of the antenna array 230 and operates as a down converter to baseband at a frequency band specific to the standard or carrier. For example, the first RF modulation unit 260-1 converts the RF signals received from antenna elements to the baseband signal at the frequency band of the first beam architecture (e.g., GSM standard). The beamformer units 250 and the BBUs 240 operate in a similar manner described above in order to recover the baseband signals for each of the beam architectures.

As a result, the antenna array according to an embodiment of the present invention has the ability to add or remove wireless standards on existing antenna architectures without the manual reconfiguration of the antenna hardware.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A transceiver for supporting multiple beam architectures in a wireless communication system, the transceiver comprising:

an antenna array including a plurality of antenna elements, the plurality of antenna elements being configured to support at least two beam architectures in a cell site, each beam architecture associated with a different configuration of sectors and beamforming signals, each beam architecture is associated with a different wireless standard.

2. The transceiver of claim 1, wherein the antenna elements are arranged as a circular array.

3. The transceiver of claim 1, further comprising:

a plurality of beamformer units, each beamformer unit being associated with a different beam architecture, each beamformer unit configured generate a number of beamforming signals, each beamforming signal including a plurality of radio-frequency (RF) signals corresponding to a sub-set of antenna elements of the plurality of antenna elements.

4. The transceiver of claim 3, wherein each beamforming signal from each beamformer unit is associated with a different sector in the cell site, and a number of beamforming signals corresponds to a number of sectors for a respective beam architecture.

5. The transceiver of claim 3, wherein at least two beamforming signals generated from one beamformer unit uses at least two of the same antenna elements in the sub-set.

6. The transceiver of claim 3, further comprising:

a plurality of baseband units, each baseband unit being associated with a different beam architecture and configured to generate baseband signals, each baseband signal corresponding to a different sector, wherein each beamformer unit is configured to generate a beamforming signal for a particular sector based on beamforming coefficients and a baseband signal received from a respective baseband unit, and each beamforming coefficient corresponds to a different antenna element in the sub-set.

7. The transceiver of claim 6, wherein each beamformer unit multiples the baseband signal with each beamforming coefficient to generate the RF signals included in one beamforming signal.

8. The transceiver of claim 3, further comprising:

a plurality of RF modulation units, each RF modulation unit configured to modulate the RF signals from a respective beamformer unit to a different frequency band.

9. The transceiver of claim 8, further comprising:

a summation unit configured to sum the modulation RF signals from each RF modulation unit, wherein the summed modulated RF signals are transmitted over the antenna elements to produce the beamforming signals for each of the at least two beam architectures.

10. A transceiver for supporting multiple beam architectures in a wireless communication system, the transceiver comprising: an antenna array including a plurality of antenna elements, the plurality of antenna elements being configured to support at least two beam architectures in a cell site, each beam architecture associated with a different configuration of sectors and beamforming signals, each beam architecture is associated with a different carrier within one wireless standard, each beamforming signal including a plurality of radio-frequency (RF) signals.

11. A transceiver for supporting multiple beam architectures in a wireless communication system, the transceiver comprising:

an antenna array including a plurality of antenna elements, the plurality of antenna elements being configured to support a first beam architecture and a second beam architecture using same antenna elements, the first beam architecture being associated with a configuration of sectors and beamforming signals that is different than the second beam architecture;

a first beamformer unit associated with the first beam architecture, and configured to generate a plurality of first beamforming signals over the antenna elements, each first beamforming signal including a plurality of first radio-frequency (RF) signals corresponding to a first sub-set of antenna elements of the antenna elements;

a second beamformer unit associated with the second beam architecture, and configured to generate a plurality of second beamforming signals over the antenna elements, each second beamforming signal including a plurality of second RF signals corresponding to a second sub-set of antenna elements of the antenna elements, the first beam architecture associated with a first wireless standard and the second beam architecture associated with a second wireless standard, the first wireless standard being different than the second wireless standard.

12. The transceiver of claim 11, wherein a number of first beamforming signals corresponds to a number of sectors in the first beam architecture, and a number of second beamforming signals corresponds to a number of sectors in the second beam architecture.

13. The transceiver of claim 11, wherein at least two first beamforming signals use at least two of the same antenna elements in the first sub-set, and at least two second beamforming signals use at least two of the same antenna elements in the second sub-set.

14. The transceiver of claim 11, further comprising:

a first baseband unit associated with the first beam architecture and configured to generate first baseband signals, each first baseband signal associated with a different sector in the first beam architecture; and a second baseband unit associated with the second beam architecture and configured to generate second baseband signals, each second baseband signal associated with a different sector in the second beam architecture, wherein the first beamformer unit is configured to generate a first beamforming signal based on first beamforming coefficients and a first baseband signal, and each first beamforming coefficient corresponds to a different antenna element in the first sub-set, wherein the second beamformer unit is configured to generate a second beamforming signal based on second beamforming coefficients and a second baseband signal, and each second beamforming coefficient corresponds to a different antenna element in the second sub-set.

15. The transceiver of claim 11, wherein a number of antenna elements in the second sub-set is greater than a number of antenna elements in the first sub-set.

16. The transceiver of 11, further comprising:

a first RF modulation unit associated with the first beam architecture, and configured to modulate the first RF signals to a first frequency band; and a second RF modulation unit associated with the second beam architecture, and configured to modulate the second RF signals to a second frequency band, the first frequency band being different than the second frequency band.

17. The transceiver of claim 16, further comprising:

a summation unit configured to sum the first modulated RF signals with the second modulated RF signals, wherein the summed modulated RF signals are transmitted over the same antenna elements to produce the first and second beamforming signals for each of the first and second beam architectures.

18. A transceiver for supporting multiple beam architectures in a wireless communication system, the transceiver comprising:

an antenna array including a plurality of antenna elements, the plurality of antenna elements being configured to support a first beam architecture and a second beam architecture using same antenna elements, the first beam architecture being associated with a configuration of sectors and beamforming signals that is different than the second beam architecture;

a first beamformer unit associated with the first beam architecture, and configured to generate a plurality of first beamforming signals over the antenna elements, each first beamforming signal including a plurality of first radio-frequency (RF) signals corresponding to a first sub-set of antenna elements of the antenna elements;

a second beamformer unit associated with the second beam architecture, and configured to generate a plurality of second beamforming signals over the antenna elements, each second beamforming signal including a plurality of second RF signals corresponding to a second sub-set of antenna elements of the antenna elements, the first and second beam architectures are associated with a same wireless standard, and the first beam architecture is associated with a carrier different than the second beam architecture.

* * * * *